(12) United States Patent
Brockett et al.

(10) Patent No.: US 8,484,016 B2
(45) Date of Patent: Jul. 9, 2013

(54) LOCATING PARAPHRASES THROUGH UTILIZATION OF A MULTIPARTITE GRAPH

(75) Inventors: Christopher John Brockett, Bellevue, WA (US); Stanley Kok, Seattle, WA (US); Dengyong Zhou, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 366 days.

(21) Appl. No.: 12/789,472

(22) Filed: May 28, 2010

(65) Prior Publication Data

US 2011/0295589 A1 Dec. 1, 2011

(51) Int. Cl.
*G06F 17/27* (2006.01)
*G06F 17/28* (2006.01)

(52) U.S. Cl.
USPC ........................................ 704/9; 704/2; 704/4

(58) Field of Classification Search
USPC .......................................................... 704/2–9
See application file for complete search history.

(56) References Cited

U.S. PATENT DOCUMENTS

| | | | |
|---|---|---|---|
| 6,901,399 B1 | 5/2005 | Corston et al. | |
| 7,412,385 B2 | 8/2008 | Brockett et al. | |
| 7,552,046 B2 | 6/2009 | Brockett et al. | |
| 7,707,026 B2 * | 4/2010 | Liu | 704/7 |
| 7,788,083 B2 * | 8/2010 | Maxwell, III | 704/2 |
| 7,937,265 B1 * | 5/2011 | Pasca et al. | 704/9 |
| 7,974,833 B2 * | 7/2011 | Soricut et al. | 704/9 |
| 8,234,106 B2 * | 7/2012 | Marcu et al. | 704/2 |
| 2002/0007267 A1 | 1/2002 | Batchilo et al. | |
| 2002/0198697 A1 | 12/2002 | Datig | |
| 2005/0102614 A1 | 5/2005 | Brockett et al. | |
| 2006/0293876 A1 | 12/2006 | Kamatani et al. | |
| 2008/0040339 A1 | 2/2008 | Zhou et al. | |
| 2008/0172378 A1 | 7/2008 | Dolan | |
| 2008/0275902 A1 | 11/2008 | Burges et al. | |
| 2009/0119090 A1 | 5/2009 | Niu et al. | |
| 2010/0010803 A1 | 1/2010 | Ishikawa et al. | |

OTHER PUBLICATIONS

Harabagiu, et al., "Answering Complex Questions with Random Walk Models", Retrieved at << http://citeseerx.ist.psu.edu/viewdoc/download?doi=10.1.1.84.9656&rep=rep1&type=pdf >>, Annual ACM Conference on Research and Development in Information Retrieval, Proceedings of the 29th annual international ACM SIGIR conference on Research and development in information retrieval, Aug. 6-11, 2006, pp. 1-8.

(Continued)

*Primary Examiner* — Jesse Pullias

(57) ABSTRACT

A method is described herein that includes acts of receiving a selection of a first phrase in a first language and executing a random walk over a computer-implemented multipartite graph, wherein the multipartite-graph includes a first set of nodes that are representative of phrases in the first language, a second set of nodes that are representative of phrases in a second language, and edges between nodes that are representative of relationships between the respective phrases. The random walk includes traversals over edges of the graph between nodes. The method also includes the act of indicating that a second phrase in the first language is a paraphrase of the first phrase based at least in part upon the random walk.

20 Claims, 8 Drawing Sheets

OTHER PUBLICATIONS

Erkan, et al., "LexRank: Graph-Based Centrality as Salience in Text Summarization", Retrieved at << http://citeseerx.ist.psu.edu/viewdoc/download?doi=10.1.1.76.1651&rep=rep1&type=pdf >>, Journal of Artificial Intelligence Research, Dec. 2004, pp. 1-23.

Erkan, Güneş, "Using Graphs and Random Walks for Discovering Latent Semantic Relationships in Text", Retrieved at << http://www.guneserkan.com/thesis.pdf >>, Ph.D. Thesis, 2007, pp. 1-124.

Dolan, et al., "Unsupervised Construction of Large Paraphrase Corpora: Exploiting Massively Parallel News Sources", Retrieved at << http://portal.acm.org/citation.cfm?id=1220406 >>, International Conference on Computational Linguistics, Proceedings of the 20th international conference on Computational Linguistics, Aug. 23-27, 2004, pp. 7.

Callison-Burch, Chris., "Syntactic Constraints on Paraphrases Extracted from Parallel Corpora", Retrieved at << http://www.cs.jhu.edu/~ccb/publications/syntactic-constraints-on-paraphrases.pdf >>, Annual Meeting of the ACL, Proceedings of the Conference on Empirical Methods in Natural Language Processing, Oct. 25-27, 2008, pp. 196-205.

Bannard, et al., "Paraphrasing with Bilingual Parallel Corpora", Retrieved at << http://portal.acm.org/citation.cfm?id=1219914 >>, Annual Meeting of the ACL, Proceedings of the 43rd Annual Meeting on Association for Computational Linguistics, Jun. 25-30, 2005, pp. 597-604.

Quirk, et al., "Monolingual Machine Translation for Paraphrase Generation", Retrieved at << http://www.mt-archive.info/EMNLP-2004-Quirk.pdf>>, in Proceedings of EMNLP, 2004, pp. 1-8.

Mei, et al., "Query Suggestion Using Hitting Time", Retrieved at << http://portal.acm.org/citation.cfm?id=1458145 >>, Conference on Information and Knowledge Management, Proceeding of the 17th ACM conference on Information and knowledge management, Oct. 26-30, 2008, pp. 1-9.

Kok, et al., "Hitting the Right Paraphrases in Good Time" retrieved at <<http://www.cs.washington.edu/homes/koks/papers/naacl10.pdf>>, pp. 1-9, Human Language Technologies: 2010 ACL Los Angeles, CA, Jun. 2010.

* cited by examiner

LOCATING PARAPHRASES THROUGH UTILIZATION OF A MULTIPARTITE GRAPH

BACKGROUND

Paraphrases, which are phrases that are formally distinct but have substantially similar semantic meanings, are a major challenge for machine processing of natural language, in fields ranging from search and information retrieval to machine translation. In an example pertaining to search, a user may enter a query to search for particular documents. The search engine, however, may not retrieve a document desired by the user unless the document includes identical terms to those included in the query. Accordingly, it is particularly important that the search engine be able to identify paraphrases of queries, thereby enabling improved information retrieval.

In another example, paraphrases can be utilized in connection with interpreting voice commands. A verbal instruction of "turn the machine off" is a paraphrase of "power down the machine" and "switch off the power". A computerized entity can desirably understand that such three phrases are paraphrases of one another, and are equivalent for the task of turning the power off of a certain machine.

Automatically learning which phrases are paraphrases of one another is a difficult problem, due at least in part to the complexities of human language. For example, entirely different words or phrases may mean the same thing in certain contexts, while substantially similar words or phrases may have entirely different meanings in certain contexts. Manually attempting to label all paraphrases in the English language, however, is such a monumental task that it is unrealistic.

SUMMARY

The following is a brief summary of subject matter that is described in greater detail herein. This summary is not intended to be limiting as to the scope of the claims.

Described herein are various technologies for automatically learning paraphrases through utilization of a computer-implemented multipartite graph that comprises nodes that are representative of phrases in multiple languages. Specifically, the multipartite graph includes nodes that are representative of phrases, wherein such phrases can be in multiple different languages. For example, the multipartite graph can include first nodes that are representative of phrases in a first language, second nodes that are representative of phrases in a second language, and third nodes that are representative of phrases in a third language. It is to be understood that a number of languages represented in a multipartite graph as described herein can be any suitable number, and is not limited to three languages. Nodes in the multipartite graph that represent phrases in different languages can be connected by edges, wherein connection of the nodes by way of an edge indicates that the phrases represented by the nodes are in some way related (e.g., a first node connected by an edge to a second node may indicate that a first phrase represented by the first node is a translation of a second phrase represented by the second node). Furthermore, these edges can be assigned weights, and the weights can be indicative of a probability that a first phrase represented by a first node is a translation of a second phrase represented by a second node.

Furthermore, the multipartite graph can include nodes that are representative of domain knowledge with respect to one or more languages. For instance, phrases in a same language that include several identical words are more likely to be paraphrases of one another than phrases in the same language that include no identical words. In yet another example, phrases in a same language that begin with a same article are more likely to be paraphrases of one another than phrases in a same language that do not start with the same article. These feature nodes can be included in the multipartite graph, and edges can connect such feature nodes to multiple nodes that represent phrases of the same language.

A random walk can be undertaken with respect to the multipartite graph, and a score can be assigned to a phrase pair (a first phrase and a second phrase) based at least in part upon a number of steps undertaken during the random walk to travel from a node representing the first phrase and a node representing the second phrase. Weights of edges can be taken into account during the random walk, such that a probability of an edge being selected during the random walk can correspond to a weight assigned to the edge. In an example, the random walk can initiate at a first node that represents a phrase of interest and can continue to a node that represents a possible translation of the phrase in another language or a feature node that is coupled to the first node. The random walk can continue from this node to another node that represents another phrase in the first language, or a third language, or a different feature node. The random walk can continue until a node that represents the aforementioned second phrase is reached. A number of steps (e.g., where a step is from a node to another node) can be indicative of whether or not the second phrase is a paraphrase of the first phrase. Counting a number of steps taken during a random walk from a first node to a second node can be referred to as hitting time. Other mechanisms, including meeting time and commute time, can also be used to determine whether two queries are paraphrases.

Once a score has been assigned to the phrase pair, this score can be utilized to determine whether or not the phrases in the phrase pair are paraphrases of one another, are similar to one another, or are relatively unrelated to one another. As will be described in greater detail herein, truncated hitting time can be utilized in connection with assigning scores to phrase pairs.

With respect to a particular phrase in a first language, scores can be assigned to multiple other phrases in such language through utilization of a random walk over the multipartite graph, and a ranked list of phrases can be output with respect to their similarity to the phrase of interest. Phrases that are found to be paraphrases can be utilized by a search engine, for example, to supplement a search over a document set. In another example, phrases that are found to be paraphrases or substantially similar phrases can be utilized as query suggestions by a search engine. In still yet another example, knowledge of which phrases are paraphrases to certain query terms can be utilized in connection with providing advertisements to a user that is utilizing a search engine to locate documents. Still further, scores can be utilized to label phrase pairs, and such phrase pairs can be utilized as training data—for instance, for a machine translation system.

Other aspects will be appreciated upon reading and understanding the attached figures and description.

DETAILED DESCRIPTION

Figure 1:
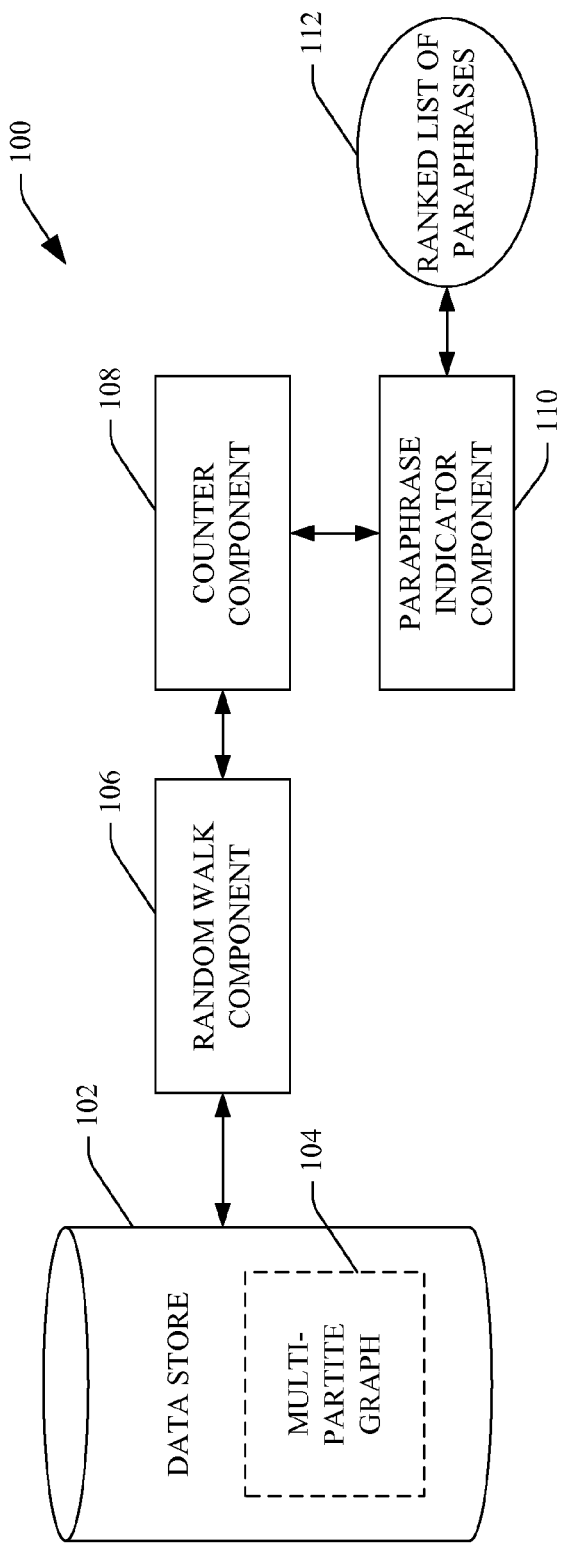
FIG. 1 is a functional block diagram of an example system that facilitates locating paraphrases through utilization of a multipartite graph.

Various technologies pertaining to automatically learning paraphrases will now be described with reference to the drawings, where like reference numerals represent like elements throughout. In addition, several functional block diagrams of example systems are illustrated and described herein for purposes of explanation; however, it is to be understood that functionality that is described as being carried out by certain system components may be performed by multiple components. Similarly, for instance, a component may be configured to perform functionality that is described as being carried out by multiple components.

With reference to FIG. 1, an example system 100 that facilitates automatically learning paraphrases is illustrated. The system 100 comprises a plurality of components that may, for example, be retained in memory of a computing device and executed by a processor.

The system 100 includes a data store 102 that comprises a multipartite graph 104. As will be described in greater detail below, the multipartite graph 104 can be a computer-implemented graph that comprises a first set of nodes that represent phrases in a first language, a second set of nodes that represent phrases in a second language, and edges between nodes in the first set of nodes and nodes in the second set of nodes. An edge that exists between two nodes indicates that the phrases represented by the nodes are in some way aligned (e.g., a first phrase represented by a first node is a translation of a second phrase represented by a second node). In other words, a first node that represents a first phrase in a first language is connected to a second node that represents a phrase in a second language by an edge if in at least one context the second phrase is a translation of the first phrase.

The system 100 further comprises a random walk component 106 that executes a random walk over the multipartite graph 104. A random walk refers to randomly or pseudo-randomly traversing edges in the multipartite graph 104 to various nodes in the multipartite graph 104. A counter component 108 can be in communication with the random walk component 106, and can count the number of steps in the random walk with respect to two nodes of interest that represent two phrases of the same language. For example, the multipartite graph 104 can include a first node in a first language, and such node can be connected to a second node in a second language by an edge. The second node in the second language can also be connected to a third node in the first language by an edge. During the random walk undertaken by the random walk component 106, such random walk can begin at the first node, travel to the second node, and thereafter travel to the third node. The counter component 108 can then count the number of steps undertaken in the random walk to get from the first node to the third node (two steps). Since the number of steps between these nodes is relatively small, it is highly likely that phrases represented by the nodes are paraphrases.

A paraphrase indicator component 110 can output a ranked list of phrases in the first language that are found to be paraphrases of a particular phrase in the first language, based at least in part upon a number of steps between two nodes of interest counted by the counter component 108 upon the random walk component 106 undertaking a random walk over the multipartite graph 104. For example, a fewer number of steps in the random walk between two nodes indicates a higher likelihood that two phrases represented by such nodes are paraphrases. In another example, the counter component 108 can be configured to compute commute time between two particular nodes. Commute time can refer to beginning at a first node in the random walk, traversing the multipartite graph 104 until a particular second node is reached, and then further traversing the multipartite graph 104 until the first node is reached again. The counter component 108 can be configured to count this round trip time, and the paraphrase indicator component 110 can assign a score to the phrase pair (the phrases represented by the first and second node) based at least in part upon the commute time.

In still yet another example, the counter component 108 can be configured to determine meeting time between nodes in the multipartite graph 104. For example, it may be desirable to determine whether a first phrase and a second phrase are paraphrases. A first node can represent the first phrase and a second node can represent the second phrase. The random walk component 106 can execute a first random walk initiating at the first node and can execute a second random walk initiating at the second node. The two random walks can continue until they intersect one another. The counter component 108 can output a value indicating the meeting time between the two nodes when the random walk component 106 executes such random walks, where the meeting time can be computed as the total number of steps of both random walks until both random walks intersect, a fewest number of steps between the two random walks when such random walks intersect, and/or a highest number of steps of the random walks when such random walks intersect. A score can be assigned to a phrase pair based at least in part upon hitting time, commute time, and/or meeting time, and this score (or a value based upon the score) can be exposed as desired. Moreover, a set of scores can be exposed such that the set of scores can be accessed by a user, an application, or the like.

Figure 2:
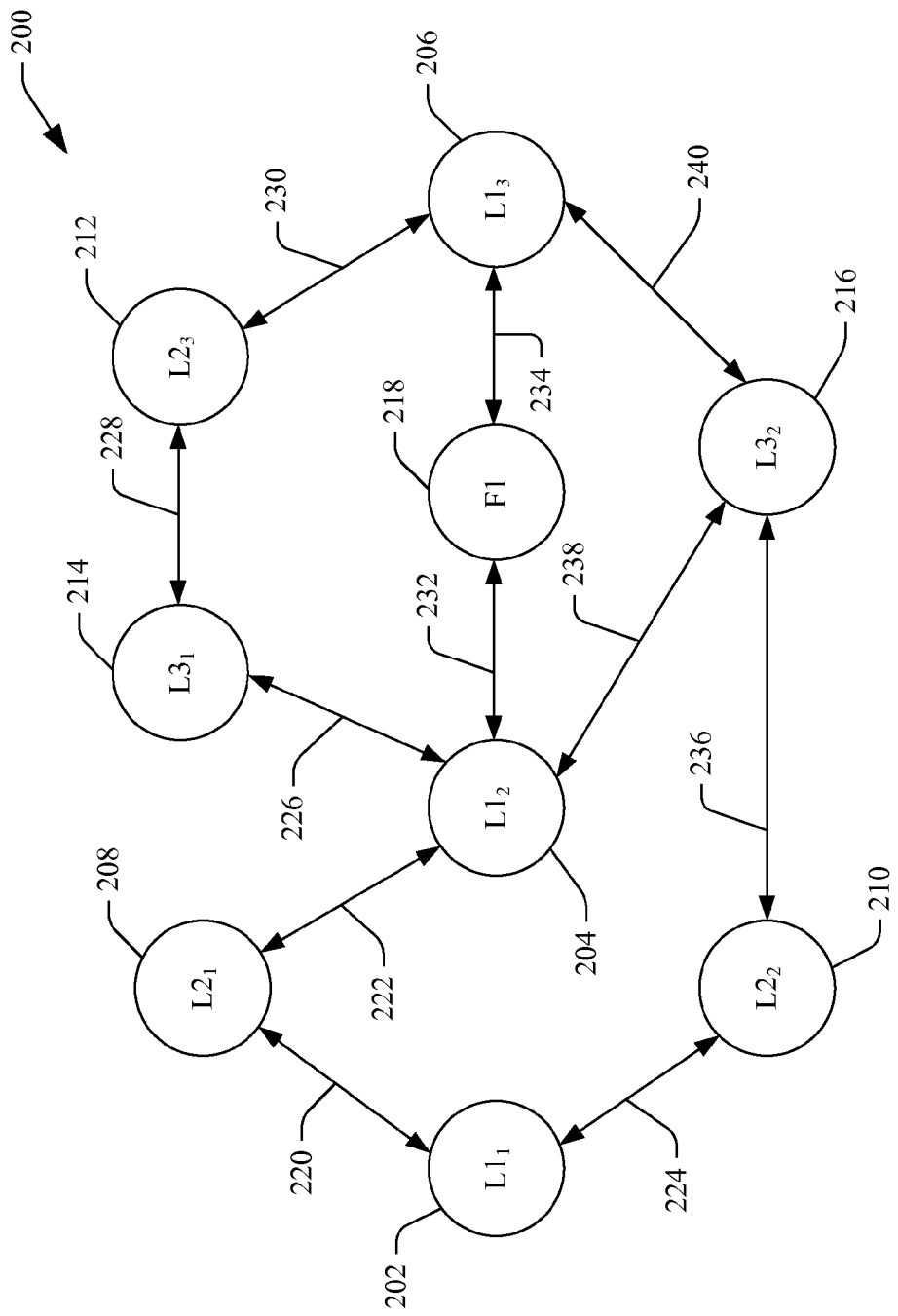
FIG. 2 is an example multipartite graph.

Referring briefly to FIG. 2, an example multipartite graph 200 upon which random walks can be executed in accordance with aspects of the invention is illustrated. The multipartite graph 200 comprises a first set of nodes that represent phrases in a first language (shown as nodes labeled as L1), a second set of nodes that represent phrases in a second language (shown as nodes labeled as L2), and a third set of nodes that represent phrases in a third language (shown as nodes labeled L3). Thus, the first set of nodes comprises nodes 202, 204 and 206; the second set of nodes comprises nodes 208, 210 and 212; and the third set of nodes comprises nodes 214 and 216.

The multipartite graph 200 may further include at least one feature node 218 that represents domain knowledge that can connect two nodes that represent phrases of the same language (be an intermediary between two nodes that represent phrases in the same language). Feature nodes will be described in greater detail herein.

The multipartite graph 200 may also comprise a plurality of edges 220-240. Edges in the multipartite graph 200 can connect nodes that are in some way related. For example, the node 202 represents phrase $L1_1$, and the node 208 represents phrase $L2_1$. In at least one context, the phrase $L2_1$ is a translation of the phrase $L1_1$. Thus, an edge 220 can connect the node 202 with the node 208. Similarly, the edge 222 can connect the node 208 with the node 204. This indicates that the phrase $L1_2$ is a translation of the phrase $L2_1$. As can be ascertained from reviewing the edges 220 and 222, since the phrase $L2_1$ is a translation for the phrase $L1_1$ and the phrase $L1_2$ is a translation of the phrase $L2_1$, the phrase $L1_2$ may be a paraphrase of the phrase $L1_1$.

Moreover, it can be ascertained that the edge 232 connects the node 204 that represents the phrase $L1_2$ with the feature node 218. This indicates that the phrase $L1_2$ includes the feature represented by the feature node 218. Similarly, $L1_3$, represented by the node 206, is coupled to the feature node 218 by the edge 234. This indicates that since the phrases $L1_2$ and $L1_3$ share the same feature, there is an increased probability that the phrases $L1_2$ and $L1_3$ are paraphrases of one another.

Furthermore, the edges 220-240 in the multipartite graph 200 can each be assigned weights. For edges that connect nodes that represent phrases in different languages, the weights can be indicative of a probability that phrases represented by connected nodes are translations of one another. A weight assigned to an edge that connects a node that represents a phrase and a feature node can be indicative of commonality of such feature with respect to phrases represented in the multipartite graph 200. Specifically, the more common the feature is amongst phrases represented in the multipartite graph 200, the lower the weight that is assigned to edges connected to the feature node that represents such feature.

Furthermore, the edges 220-240 are shown as being bidirectional in the multipartite graph 200. It is to be understood that in some instances or implementations, edges may be unidirectional. For example, because a phrase in a first language is a translation of a phrase in a second language does not necessarily mean that the phrase in the second language is a translation of the phrase in the first language. It is to be understood that weights can be assigned to edges regardless of whether they are bidirectional or unidirectional. Additionally, while the multipartite graph 200 is illustrated as comprising nodes that are representative of phrase in three different languages, it is to be understood that a multipartite graph in accordance with this invention can comprise any suitable sets of nodes that correspond to any suitable number of different languages.

An exemplary random walk that can be undertaken by the random walk component 106 (FIG. 1) will now be described. Pursuant to an example, paraphrases (in the first language) of the phrase $L1_1$ may be desirably determined. The random walk component 106 can initiate a random walk at the node 202, and the edge 220 can be randomly or pseudo-randomly selected (taking into consideration the weights of the edges 220 and 224 that connect the node 202 to other nodes). The random walk can continue from node 208 to the node 204 along the edge 222. During this random walk, the number of steps between the node 202 and the node 204 is two. The random walk may then continue along the edge 226 to the node 214, which represents the phrase $L3_1$. The random walk may follow the edge 228 to the node 212, which represents the phrase $L2_3$, and thereafter continue along the edge 230 to the node 206, which represents the phrase $L1_3$ (another phrase in the first language). The counter component 108 can count the number of steps between the node 202 and the node 206 during the random walk, which in this example is five. Continuing with this example, the paraphrase indicator component 110 (FIG. 1) can output a ranked list that comprises the phrase $L1_2$ and the phrase $L1_3$, wherein the phrase $L1_2$ is placed higher on the list than the phrase $L1_3$, due to the fewer number of steps undertaken during the random walk to reach the node 204 from the node 202 when compared to the number of steps taken to reach the node 206 from the node 202.

This example random walk utilizes hitting time to determine whether two phrases are paraphrases. It is to be understood, however, that commute time and/or meeting time can be utilized to determine paraphrases for a particular phrase.

To increase accuracy, the random walk component 106 can cause a plurality of random walks to be initiated from the node 202. For instance, in a second random walk, the edge 224 can be selected to reach the node 210, which represents the phrase $L2_2$. Thereafter, the edge 236 can be selected to reach node 216, which represents the phrase $L3_2$, and thereafter the edge 240 can be selected to reach the node 206, which represents the phrase $L1_3$. In this example, the hitting time from the node 202 to the node 206 can be counted by the counter component 108 as being three steps. The random walk may then continue along the edge 234 to the feature node 218, and thereafter from the feature node 218 along the edge 232 to node 204, which represents the phrase $L1_2$. Thus, the counter component 108 can output five as the number of steps required to reach the node 204 from the node 202. Pursuant to an example, hitting times determined from a plurality of random walks initiated at a same node can be averaged, and the paraphrase indicator component 110 can output the ranked list of paraphrases 112 (FIG. 1) based at least in part upon such averages.

The multipartite graph 200 has been provided for purposes of illustration. However, in actuality such graph is quite small as compared to an actual multipartite graph that includes numerous phrases and various different languages. Accordingly, rather than allowing the random walk to proceed across an essentially limitless number of edges, a number of steps that can be taken during the random walk can be limited to a threshold value. This can be referred to as truncated hitting time.

Multipartite graphs and random walks will now be defined with more formality. A multipartite graph can include a variety of sets of nodes that correspond to phrases in different languages. Collectively, these sets of nodes can be referred to as V, and the nodes can be connected by edges E. A directed edge is a pair (i, j) where i, j∈V. Associated with such graph is a |V|×|V| adjacency matrix W. Each entry $W_{ij}$ in the matrix is the weight of the edge (i, j), or zero if the edge does not exist.

When a random walk is undertaken by the random walk component 106, edges are traverses to travel from node to node in the multipartite graph. For example, at time step t, the random walk can begin at node i. In the next step, the random walk can move to node j, with a probability proportional to the weight of the edge (i, j) (e.g., with probability $W_{ij}/\Sigma_j W_{ij}$. This probability is known as the transition probability from i to j. It can be noted that transition probabilities from a node to neighboring nodes can sum to one.

The hitting time $h_{ij}$ from node i to j is defined as an average number of steps taken in a random walk starting from i to visit j for the first time. Hitting time has a property of being robust to noise, which is a desirable property for the multipartite graphs considered herein, since they are based upon multilingual parallel corpora including numerous spurious alignments between phrases. Hitting time, however, may have a drawback to being sensitive to portions of the graph that are very far from the start node, since hitting time takes into account paths of length up to infinity.

Accordingly, truncated hitting time can be utilized to limit a number of steps taken during a random walk to at most T steps. The truncated hitting time $h_{ij}^T$ from node i to j can be defined as an average number of steps taken to reach j for the first time, starting from i in a random walk that is limited to T steps. $h_{ij}^T$ is defined to be zero if i=j or T=0, and to be T if j is not reached in T steps. As T→∞, $h_{ij}^T$→$h_{ij}$.

In large multipartite graphs, truncated hitting time can be approximated by the counter component 108 with relatively high probability through utilization of sampling. That is, M independent length-T random walks from node i can be executed. In m of such walks, node j may be visited for the first time at steps $t_j^1, \ldots, t_j^m$. The estimated truncated hitting time can be given by the following:

$$\hat{h}_{ij}^T = \frac{\sum_{k=1}^{m} t_j^k}{M} + \left(1 - \frac{m}{M}\right)T. \quad (1)$$

Pursuant to an example, a number of samples of random walks M may be at least $$\frac{1}{2\epsilon^2} \log \frac{2n}{d}$$

in order for the estimated truncated hitting time to be a good estimate of actual truncated hitting time with high probability (e.g., for $P(|\hat{h}_{ij}^T - h_{ij}^T| \leq \epsilon T) \geq 1-\delta$, where n is a number of nodes in the graph, $\epsilon$ and $\delta$ are user specified parameters, and $0 \leq \epsilon, \delta \leq 1$).

Figure 3:
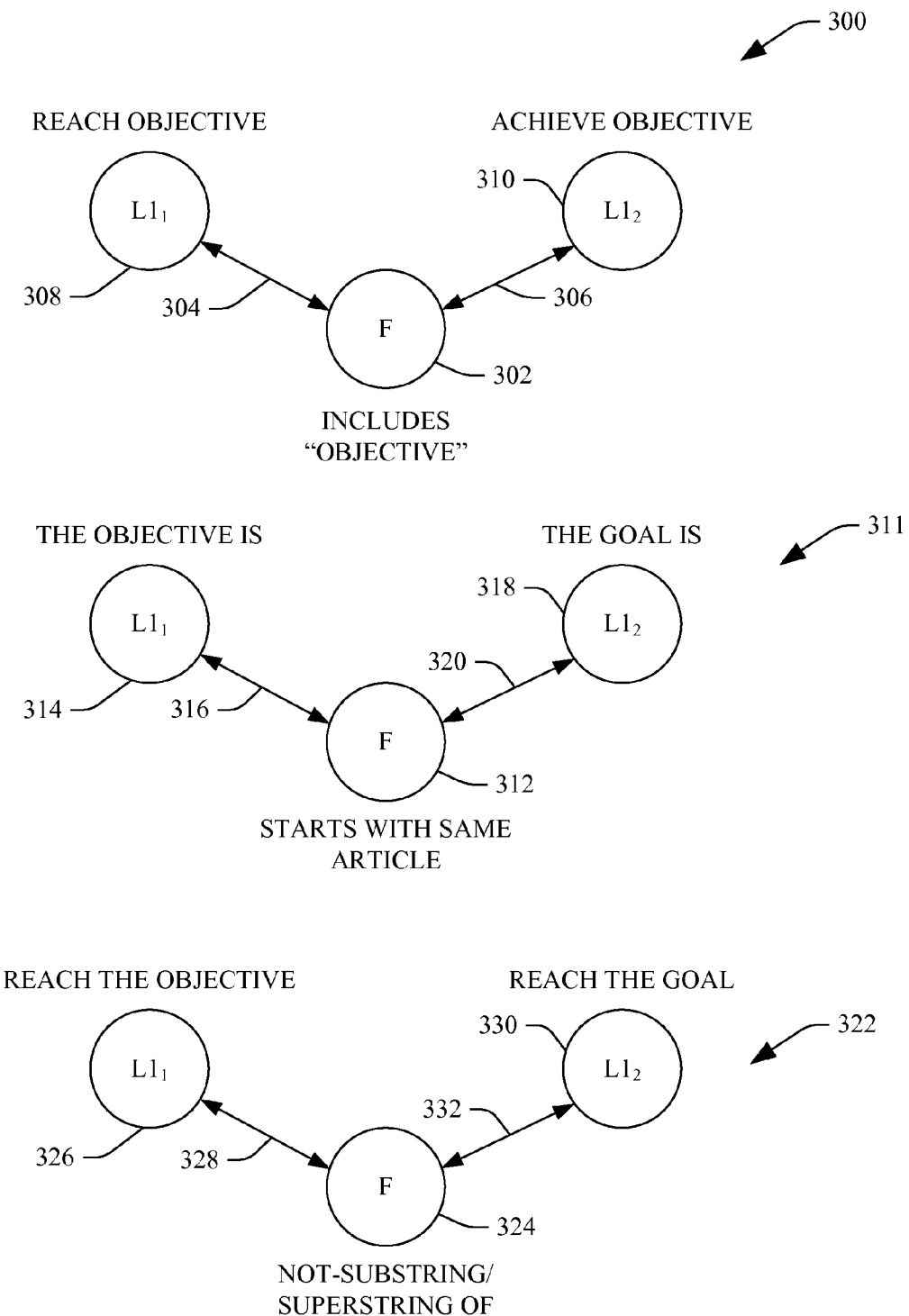
FIG. 3 illustrates example feature nodes that can be included in a multipartite graph.

Referring now to FIG. 3, example types of feature nodes are illustrated. In a first example 300, a feature node 302 that is connected by edges 304 and 306 to nodes 308 and 310, respectively, can be an ngram node. In this example, the node 308 can represent a phrase "reach objective", and a node 310 can represent the phrase "achieve objective". The feature node 302 can capture the domain knowledge that phrases containing many words in common are likely to be paraphrases. For instance, for each 1 to 4-gram that appears in a phrase, an ngram node can be created. Directed edges (a, j) and (j, a) can be added if node j represents a phrase that includes ngram a. In this example, the node 308 representing the phrase "reach objective" is connected to the feature node 302, as it includes the term "objective". Similarly, the node 310 that represents the phrase "achieve objective" is connected to the feature node 302 by the edge 306, because the aforementioned phrase also includes the term "objective".

In a second example 311, a feature node 312 can be a syntax node, and can represent syntactic classes of the start and end words of certain phrases. For instance, classes can be created such as interrogatives (whose, what, where, etc.), articles (the, a, an, . . . ), etc. For each class c, syntax nodes $a_c$ and $a'_c$ can be created to respectively represent conditions that a phrase begins and ends with a word in class c. Directed edges ($a_c$, j) and (j, $a_c$) are added if node j starts with a word in class c (similarly, edges ($a'_c$, j) and (j, $a'_c$) can be added to a multipartite graph if phrases represented by nodes end with a word in class c.) In the example 311, a node 314 that represents the phrase "the objective is" is connected to the feature node 312 by way of an edge 316, because the phrase begins with the article "the". Similarly, a node 318 that represents the phrase "the goal is" is connected to the feature node 312 by way of an edge 320, because it also begins with the article "the". Such syntax nodes allow capture of a broad commonality about structural distribution without requiring syntactic equivalency or the use of a parser.

In a third example 322, a feature node 324 can represent that the feature that phrases represented by nodes are not substrings or superstrings of a particular word or phrase. For example, many English phrases (e.g. "reach the objective" and "reach the") that are superstrings or substrings of each other are often aligned to several shared non-English phrases in bilingual parallel corpora that can be used to build a multipartite graph. Most such English phrase pairs are not paraphrases, but may be linked by many short paths via their common aligned foreign phrase, and therefore have small hitting times (this can cause false positives with respect to identifying a substring/superstring as a paraphrase of a certain phrase). To counteract this problem, a feature node can be created that indicates that two phrases represented by nodes are not substrings or superstrings of each other. Thus, a node 326 which represents the phrase "reach the objective" is connected to the feature node 324 by way of an edge 328, and a node 330 that represents the phrase "reach the goal" is connected to the feature node 324 by way of an edge 332, as the phrases are not superstrings or substrings of each other. In an example, a particular node that represents a phrase of interest (where the random walk is initiated) can be connected to the feature node 324, and edges (a, j) and (j, a) can be added if a node representing the English phrase j is not a substring or superstring of the phrase of interest. While three types of feature nodes have been described herein, it is to be understood that other types of feature nodes that can capture some language domain knowledge can be included in a multipartite graph as described herein.

Returning to FIG. 2, in the example graph 200, it can be ascertained that any node in the multipartite graph 200 representing a phrase in a certain language can have four kinds of edges: edges to nodes representing phrases in different languages and edges to the aforementioned three types of feature nodes. $f_{phrase}$, $f_{ngram}$, $f_{syntax}$, and $f_{substring}$ can denote the distribution of transition probabilities among the four kinds of outgoing edges. In an example, $f_{phrase}+f_{ngram}+f_{syntax}+f_{substring}=1.0$. These values can be user specified or can be set with tuning data. An outgoing edge from a phrase node i of a first language that originally had weight (transition probability) $W_{ij}$ may now have a weight $W_{ij} \times f_{phrase}$. All k edges from i to ngram nodes can have a weight $$\frac{f_{ngram}}{k}.$$

This can be substantially similar for edges to other types of feature notes.

While four example types of edges have been described above, it is to be understood that a multipartite graph may include other types of edges or may not include one or more of the four types of edges listed above. For example, a multipartite graph can comprise one or more of the following types of edges as well as other types of edges: (1) edges that indicate that two connected nodes represent paraphrases from a curated thesaurus (e.g., using pre-existing knowledge as confirmation); (2) edges that indicate that two connected nodes represent paraphrases acquired by aligning monolingual corpora; (3) edges that indicate that two connected nodes represent paraphrases acquired by way of distribution similarity techniques, amongst others. With respect to the example type of edge (2), phrase tables that indicate paraphrases in the same language can be utilized to generate edges between two nodes that represent phrases in the same language.

Figure 4:
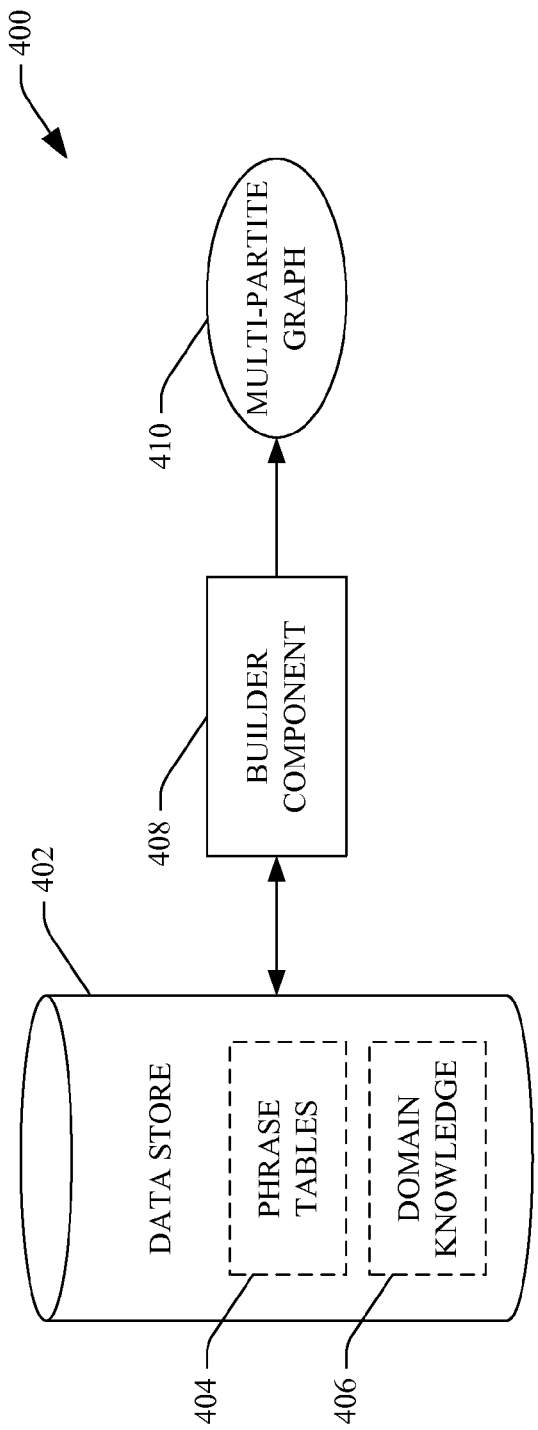
FIG. 4 is an example system that facilitates building a multipartite graph based at least in part upon multilingual phrase tables.

Referring now to FIG. 4, an example system 400 that facilitates building a multipartite graph such as the multipartite graph 200 shown in FIG. 2 is illustrated. The system 400 comprises a data store 402 that includes phrase tables 404 and domain knowledge 406. This domain knowledge 406 can be utilized to create the feature nodes that have been described above. A builder component 408 can build a multipartite graph 410 based at least in part upon contents of the phrase tables 404 and the domain knowledge 406.

Figure 5:
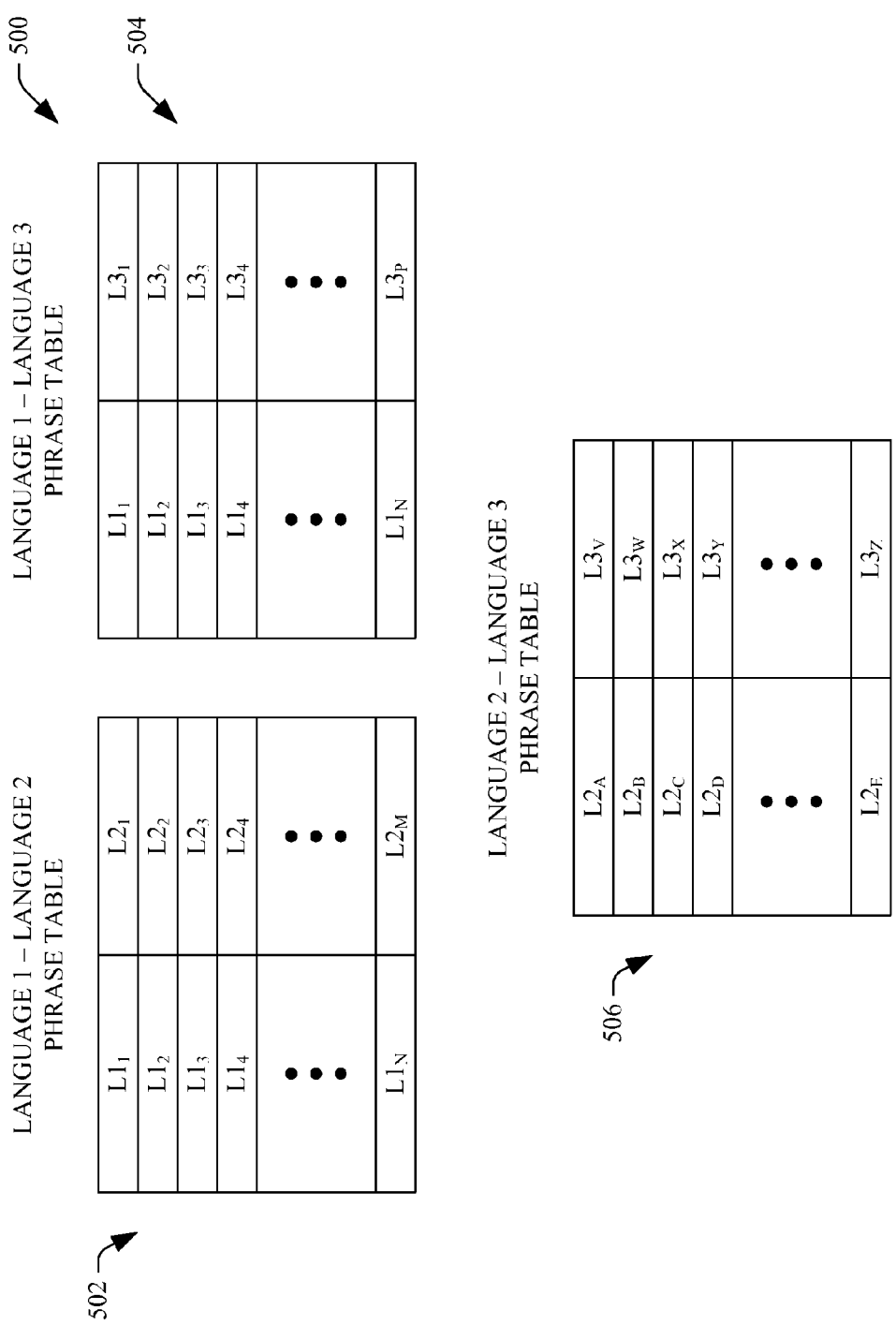
FIG. 5 includes depictions of multiple phrase tables.

Turning briefly to FIG. 5, a plurality of example phrase tables 500 that can be included in the data store 402 (FIG. 4) are illustrated. Pursuant to an example, the phrase tables 500 can be generated by bilingual parallel corpus utilized in connection with machine translation systems. A bilingual parallel corpus can comprise sentences in two languages. Two sentences that are translations of one another are paired together, and a phrase in one sentence is aligned with a phrase in the other with a substantially similar semantic meaning. The phrase tables 500 include a first phrase table 502 that illustrates an example phrase table between phrases in a first language and a second language, a second phrase table 504 that includes phrases in the first language and phrases in a third language, and a third phrase table 506 that includes phrases in the second language and corresponding phrases in the third language. By aligning phrases, for a phrase E in the first language, both a number of times such phrase occurs in the phrase table and the number of times it is aligned with a phrase G in the other language can be counted. The number of times a phrase occurs can be specified as $Count_E$, and a number of times such phrases align with a phrase G in the other language can be referred to as $Count_{E,g}$. With such counts, the probability of G given E can be shown as $$P(G|E) = \frac{Count_{E,G}}{Count_E}.$$

Returning to FIG. 4, the builder component 408 can represent a node as a phrase in one of the phrase tables, and a directed edge can exist between nodes i and j if their corresponding phrases are aligned in the phrase table. Weights assigned to the edges can be initially given by P (i|j).

The first approach that can be undertaken by the builder component 408 in building the multipartite graph 410 from multiple phrase tables is to create a node for every phrase in the phrase tables, and two directed edges (i, j) and (j, i) for every aligned phrase pair i and j. Thus, the builder component 408 can build a graph that can be referred to herein as H. Such an approach may not be tractable for relatively large multilingual corpora. Accordingly, the builder component 408 can approximate this full graph with a graph H' that includes nodes "near" to the node representing a phrase of interest. For example, the builder component 408 can perform a breadth first search, starting from a node of interest up to a depth d, or until a number of nodes visited in the search has reached a maximum of n nodes. It can be ascertained that some nodes at the periphery of a particular node have edges to nodes that are not in H' that exist in H. For a periphery node j that has edges to nodes $j_1, \ldots, j_k$ outside H', the builder component 408 can generate a "dummy" node a, and replace edges $(j, j_1), \ldots, (j, j_k)$ with a single edge (j, a) with weight $\Sigma_{x=1}^{k} W_{j,j_x}$. The builder component 408 can also add edges (a, j) and (a, a), each with a weight of 0.5. Therefore, the dummy nodes and their edges can approximate the transition probabilities at the periphery of H'.

The builder component 408 may then be further configured to prune H'. Specifically, the builder component 408 can call the random walk component 106 (FIG. 1) which can run M independent length-T random walks on H', beginning from a node of interest, to estimate the truncated hitting times of all nodes in H'. A node in H' may have many outgoing edges, many of which may be due to spurious alignments between their corresponding phrases. The builder component 408 may select among a node's top l outgoing edges with the highest transition probabilities when deciding which node to visit next at each step of a random walk.

For each random walk k, the builder component 408 can record the first time that a node j is visited $t_j^k$. Using Equation (1), the builder component 408 can estimate the truncated hitting time of each node. Thereafter, the builder component 408 can remove nodes and their associated edges that are "far" from the node of interest (e.g., with times equal to T). Such nodes either are not visited in any of the random walks or are always visited for the first time at step T.

To the resulting pruned graph, the builder component 408 can add the feature nodes that have been described above. As indicated, these feature nodes can include ngram nodes, syntax nodes, and not-substring/superstring-of nodes. As these feature nodes are added to the multipartite graph by the builder component 408, the weights of edges can be adjusted as indicated previously.

Figure 6:
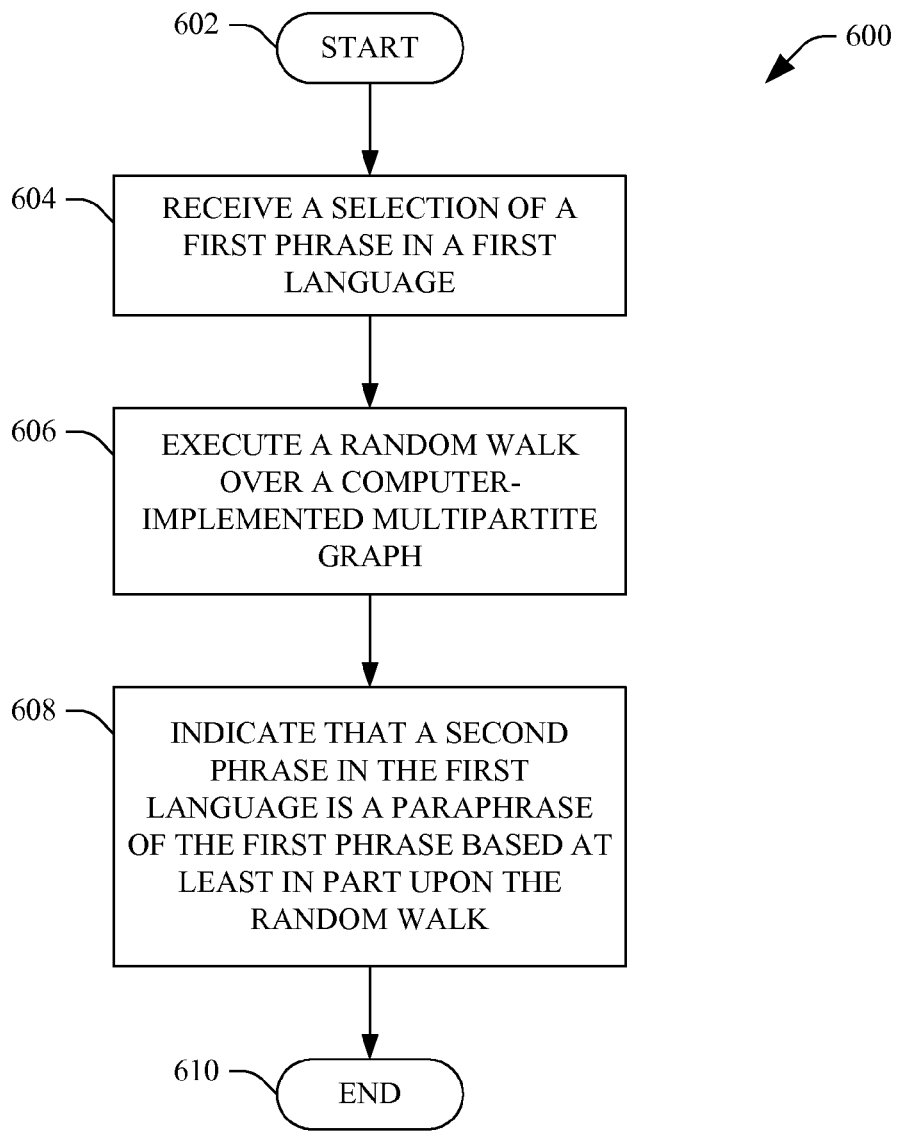
FIG. 6 is a flow diagram that illustrates an example methodology for executing a random walk over a computer-implemented multipartite graph.
Figure 7:
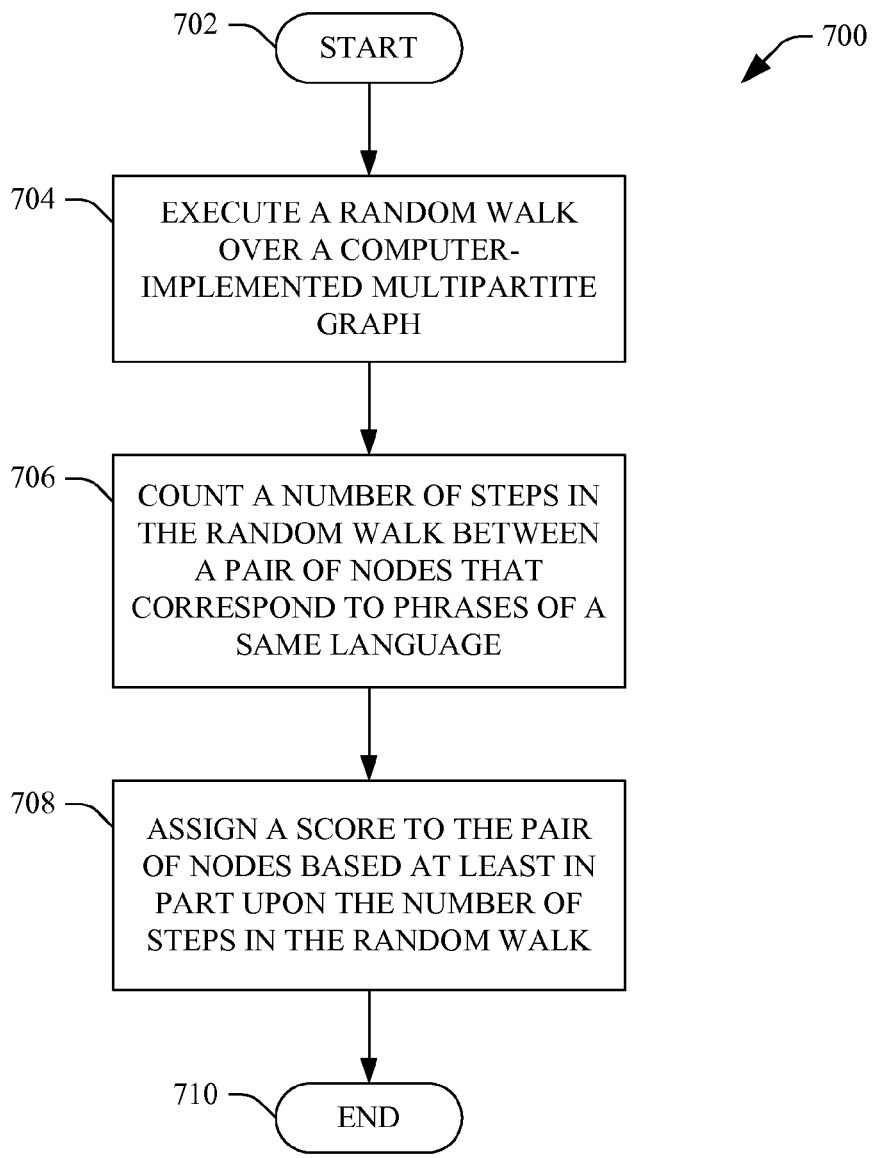
FIG. 7 is a flow diagram that illustrates an example methodology for determining a hitting time when a random walk is performed over a multipartite graph.

With reference now to FIGS. 6 and 7, various example methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be a non-transitory medium, such as memory, hard drive, CD, DVD, flash drive, or the like.

Referring now to FIG. 6, a methodology 600 that facilitates automatically learning paraphrases to a phrase of interest is illustrated. The methodology 600 starts at 602, and at 604 a selection of a first phrase in a first language is received. In a particular example, the first language can be English.

At 606, a random walk is executed over a computer-implemented multipartite graph, wherein the multipartite graph comprises a first set of nodes that are representative of phrases in the first language, a second of nodes that are representative of phrases in a second language, and edges between nodes are representative of relationships between the respective phrases (e.g., the nodes represent phrases that are translations of one another). As described above, the random walk comprises traversals over edges of the graph between nodes of such graph.

At 608, data is output that indicates that a second phrase in the first language is a paraphrase of the first phrase in the first language based at least in part upon the random walk. This indication can be based at least in part upon hitting time between a node that represents the first phrase and a node that represents the second phrase, commute time between such nodes, and/or meeting time with respect to such nodes. The methodology 600 completes at 610.

With reference now to FIG. 7, an example methodology 700 that facilitates outputting a ranked list of phrases upon receipt of a phrase of interest, wherein the ranked list indicates whether certain phrases are paraphrases of the phrase of interest, is illustrated. The methodology 700 starts at 702, and at 704 a random walk is executed over a computer implemented multipartite graph. In this example methodology 700, the multipartite graph can include a first set of nodes that represent phrases in a first language, a second set of nodes that represent phrases in a second language, a third set of nodes that represent phrases in a third language, and at least one feature node that represents domain knowledge pertaining to the first language. Of course other sets of nodes that represent phrases in other languages can also be included in the multipartite graph. The multipartite graph also includes edges between nodes that represent relationships between nodes connected by the edges. These relationships can be indications that two phrases in different languages are aligned in phrase tables. In another example, relationships represented by the edges can be indicative of the fact that a phrase in the first language includes a feature represented by a feature node connected to such node. When the random walk is executed, the random walk can begin at a first node in a first set of nodes, and can travel over various edges to other nodes in the multipartite graph.

At 706 a number of steps taken in the random walk between the first node in the first set of nodes and a second node in the first set of nodes is counted. That is, a number of steps between nodes representing phrases in the same language can be counted, pursuant to an example, so long as the number of steps is below some threshold T.

At 708, a score is assigned to a pair of phrases (a first phrase and a second phrase) that correspond to the first node and the second node based at least in part upon the number of steps in the random walk between the first node and the second node. The score assigned can be indicative of whether the second phrase is a paraphrase of the first phrase.

Figure 8:
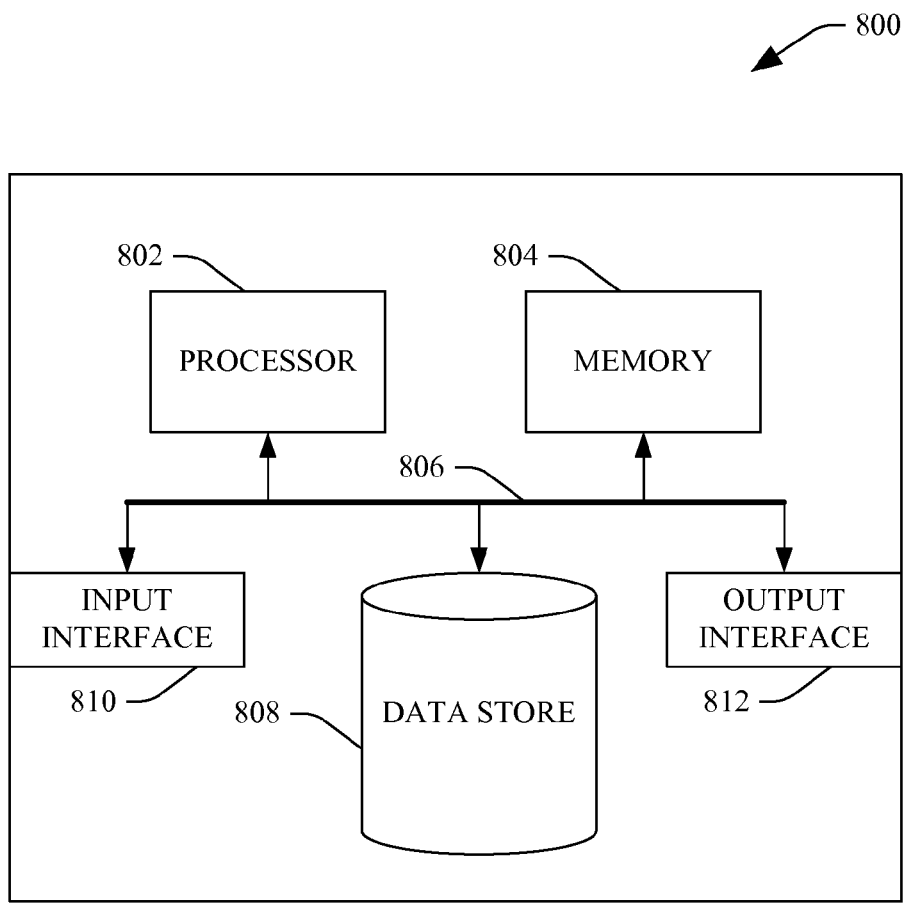
FIG. 8 is an example computing system.

Now referring to FIG. 8, a high-level illustration of an example computing device 800 that can be used in accordance with the systems and methodologies disclosed herein is illustrated. For instance, the computing device 800 may be used in a system that supports automatically learning paraphrases of a particular phrase through utilization of a multipartite graph. In another example, at least a portion of the computing device 800 may be used in a system that supports building a multipartite graph based at least in part upon phrase alignments in phrase tables that are utilized in machine translation systems. The computing device 800 includes at least one processor 802 that executes instructions that are stored in a memory 804. The memory 804 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store phrases, phrase tables, edges, weights assigned to edges in a multipartite graph, the multipartite graph, etc.

The computing device 800 additionally includes a data store 808 that is accessible by the processor 802 by way of the system bus 806. The data store 808 may be or include any suitable computer-readable storage, including a hard disk, memory, etc. The data store 808 may include executable instructions, a multipartite graph, phrase tables, phrases etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc. by way of the output interface 812.

Additionally, while illustrated as a single system, it is to be understood that the computing device 800 may be a distributed system. Thus, for instance, several devices may be in communication by way of a network connection and may collectively perform tasks described as being performed by the computing device 800.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices. Furthermore, a component or system may refer to a portion of memory and/or a series of transistors.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method comprising the following computer-executable acts:
   receiving a selection of a first phrase in a first language;
   executing a random walk over a computer-implemented multipartite graph, wherein a number of steps undertaken during the random walk is limited to a threshold number, wherein the multipartite graph comprises a first set of nodes that are representative of phrases in the first language, a second set of nodes that are representative of phrases in a second language, and edges between nodes that are representative of relationships between the respective phrases, and wherein the random walk comprises traversals over edges of the graph between nodes; and
   indicating that a second phrase in the first language is a paraphrase of the first phrase based at least in part upon the random walk.

2. The method of claim 1, wherein the multipartite graph comprises nodes that are representative of phrases in a third language.

3. The method of claim 1, further comprising:
   receiving the first phrase as at least a portion of a query that is desirably input to a search engine; and
   responsive to receiving the first phrase, causing the search engine to execute a search over a plurality of documents based at least in part upon the second phrase.

4. The method 1, further comprising:
   receiving the first phrase as at least a portion of a query that is desirably input to a search engine; and
   responsive to receiving the first phrase, causing the search engine to display the second phrase as a suggested query.

5. The method of claim 1, further comprising:
   receiving the first phrase as at least a portion of a query that is desirably input to a search engine; and
   responsive to receiving the first phrase, causing an advertisement to be displayed based at least in part upon the second phrase.

6. The method of claim 1, wherein an edge between a first node in the first set of nodes that represents a phrase in the first language and a second node in the second set of nodes that represents a phrase in the second language indicates that the phrase in the first language has a substantially similar semantic meaning to the phrase in the second language.

7. The method of claim 6, wherein the edges in the multipartite graph are assigned weights, and wherein a weight assigned to an edge is indicative of a probability that nodes connected by the edge have a substantially similar semantic meaning.

8. The method of claim 1, further comprising constructing the multipartite graph from phrase tables, wherein the phrase tables comprise phrases in the first language and translations of the phrases in the second language.

9. The method of claim 1, further comprising outputting a ranked list of phrases that are paraphrases of the first phrase based at least in part upon the random walk.

10. The method of claim 1, wherein the first phrase is represented by a first node in the multipartite graph and the second phrase is represented by a second node in the multipartite graph, and further comprising:
counting a number of steps in the random walk between the first node and the second node; and
indicating that the second phrase is a paraphrase of the first phrase based at least in part upon the number of steps.

11. The method of claim 1, wherein the multipartite graph further comprises a third set of nodes that are representative of domain knowledge with respect to a particular language, and wherein edges exist between a node in the third set of nodes and multiple nodes in the first set of nodes.

12. A computing apparatus, comprising:
a processor; and
a memory that comprises components that are executed by the processor, the components comprising:
a random walk component that executes a random walk over a multipartite graph, wherein the multipartite graph comprises a first set of nodes that represent phrases in a first language, a second set of nodes that represent phrases in a second language, and edges between nodes in the first set of nodes and nodes in the second set of nodes, wherein an edge between two nodes indicates that phrases represented by the two nodes have a substantially similar semantic meaning, wherein the edges in the multipartite graph are weighted, and wherein the random walk component considers weights assigned to the edges when undertaking the random walk; and
a paraphrase indicator component that outputs a ranked list of phrases in the first language that are found to be paraphrases of a first phrase in the first language based at least in part upon the random walk executed by the random walk component.

13. The computing apparatus of claim 12, wherein the multipartite graph comprises a third set of nodes that represent phrases in a third language.

14. The computing apparatus of claim 12, wherein the components further comprise a counter component that counts a number of steps taken during the random walk between a first node representing the first phrase and a second node representing a second phrase in the ranked list of phrases, and wherein the paraphrase indicator component ranks the second phrase amongst phrases in the ranked list of phrases based at least in part upon the number of steps taken during the random walk.

15. The computing apparatus of claim 14, wherein the number of steps is limited to a threshold value.

16. The computing apparatus of claim 12, further comprising a builder component that accesses a phrase table and builds the multipartite graph based at least in part upon contents of the phrase table, wherein the phrase table comprises phrases in the first language and translations of such phrases in the second language.

17. The computing apparatus of claim 12, wherein the multipartite graph comprises at least one feature node, wherein the at least one feature node is representative of domain-specific knowledge pertaining to two or more phrases in the first language, and wherein the at least one feature node is an intermediary between the two or more nodes in the first set of nodes.

18. A computing device comprising a computer-readable medium, the computer-readable medium comprising instructions that, when executed by a processor, cause the processor to perform acts comprising:
executing a random walk over a computer-implemented multipartite graph, wherein the multipartite graph comprises:
a first set of nodes that represent phrases in a first language;
a second set of nodes that represent phrases in a second language;
a third set of nodes that represent phrases in a third language;
at least one feature node that represents a feature pertaining to phrases in the first language; and
edges between nodes that represent relationships between nodes connected by the edges;
wherein the random walk begins at a first node in the first set of nodes and travels over edges to other nodes in the multipartite graph;
counting a number of steps in the random walk between the first node in the first set of nodes and a second node in the first set of nodes; and
assigning a score to a phrase pair comprising a first phrase represented by the first node and a second phrase represented by the second node based at least in part upon the number of steps taken in the random walk between the first node and the second node, wherein the score is indicative of whether the second phrase is a paraphrase of the first phrase.

19. The computing device of claim 18, wherein the number of steps undertaken during the random walk is limited to a threshold number.

20. The computing device of claim 18, wherein the edges in the multipartite graph are weighted, and wherein the weights assigned to the edges are considered when executing the random walk.

* * * * *

UNITED STATES PATENT AND TRADEMARK OFFICE
CERTIFICATE OF CORRECTION

| | | |
|---|---|---|
| PATENT NO. | : 8,484,016 B2 | Page 1 of 1 |
| APPLICATION NO. | : 12/789472 | |
| DATED | : July 9, 2013 | |
| INVENTOR(S) | : Brockett et al. | |

It is certified that error appears in the above-identified patent and that said Letters Patent is hereby corrected as shown below:

In the Claims

Column 12, line 55, in claim 4, delete "1," and insert -- of claim 1, --, therefor.

Signed and Sealed this
Tenth Day of February, 2015

Michelle K. Lee
*Deputy Director of the United States Patent and Trademark Office*